United States Patent [19]

Poloni

[11] Patent Number: 4,966,060

[45] Date of Patent: Oct. 30, 1990

[54] VERY HIGH SPEED FLYING SHEARS

[75] Inventor: Alfredo Poloni, Ronchi Dei Legionari, Italy

[73] Assignee: Danieli & C. Officine Meccaniche SpA, Buttrio, Italy

[21] Appl. No.: 209,055

[22] Filed: Jun. 15, 1988

[30] Foreign Application Priority Data

Jun. 30, 1987 [IT]  Italy ............................. 83398 A/87

[51] Int. Cl.⁵ ............................................. B23D 25/08
[52] U.S. Cl. ....................................... 83/105; 83/112; 83/165; 83/306; 83/444
[58] Field of Search ................... 83/37, 343, 162, 112, 83/443, 444, 438, 105, 165, 306

[56] References Cited

U.S. PATENT DOCUMENTS 3,834,260  9/1974  Sieurin et al. ...................... 83/106

FOREIGN PATENT DOCUMENTS 481603   8/1929  Fed. Rep. of Germany .
804056   4/1951  Fed. Rep. of Germany .
2145020  3/1971  Fed. Rep. of Germany .
666433  12/1928  France .
1578587  8/1969  France .
2075899 11/1981  United Kingdom .

Primary Examiner—Douglas D. Watts
Assistant Examiner—Rinaldi Rada
Attorney, Agent, or Firm—Wegner & Bretschneider

[57] ABSTRACT

Very high speed flying shears (10) which is suitable to shear rolled stock (18) travelling even at more than 100 meters per second and comprises two knives (14) with blades (17) able to contrarotate in relation to each other at a preset speed at least in the transient period of shearing and is equipped with a guide (11) able to move sideways (19–119) at a pre-set speed (V) and to position itself in a defined position in relation to the circumferential position of the blades (17), an inner dividing wall (27) being located downstream of the knives (14) in a conveyor channel (13), in which shears (10) during the transient period of shearing;

the speeds (VR) of lateral movement of the guide (11) and of rotation of the knives (14) are correlated, and the lateral position of the guide (11) and the cirmcumferential position of the blades (17) of the knives (14) are strictly interdependent.

27 Claims, 8 Drawing Sheets

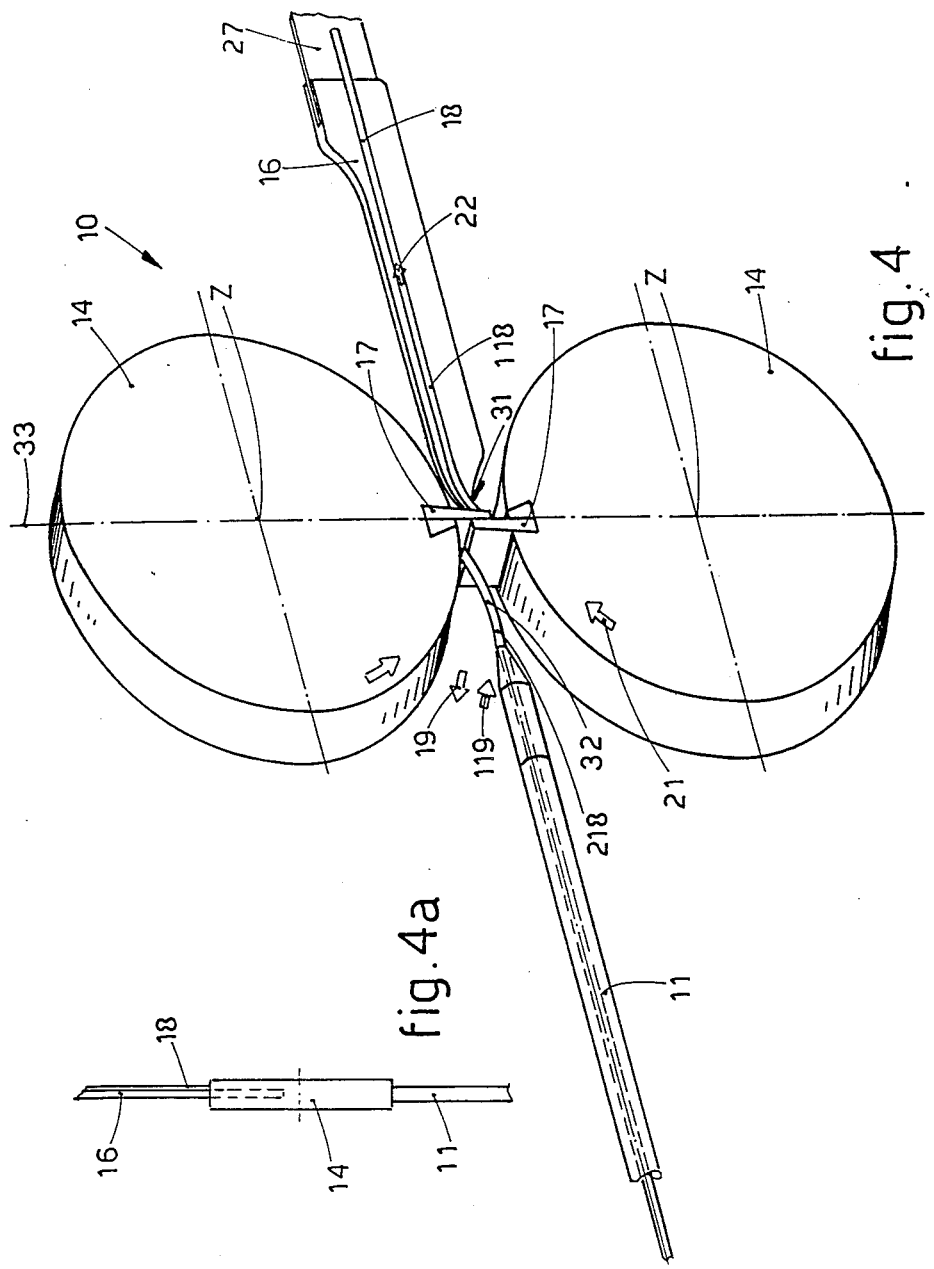

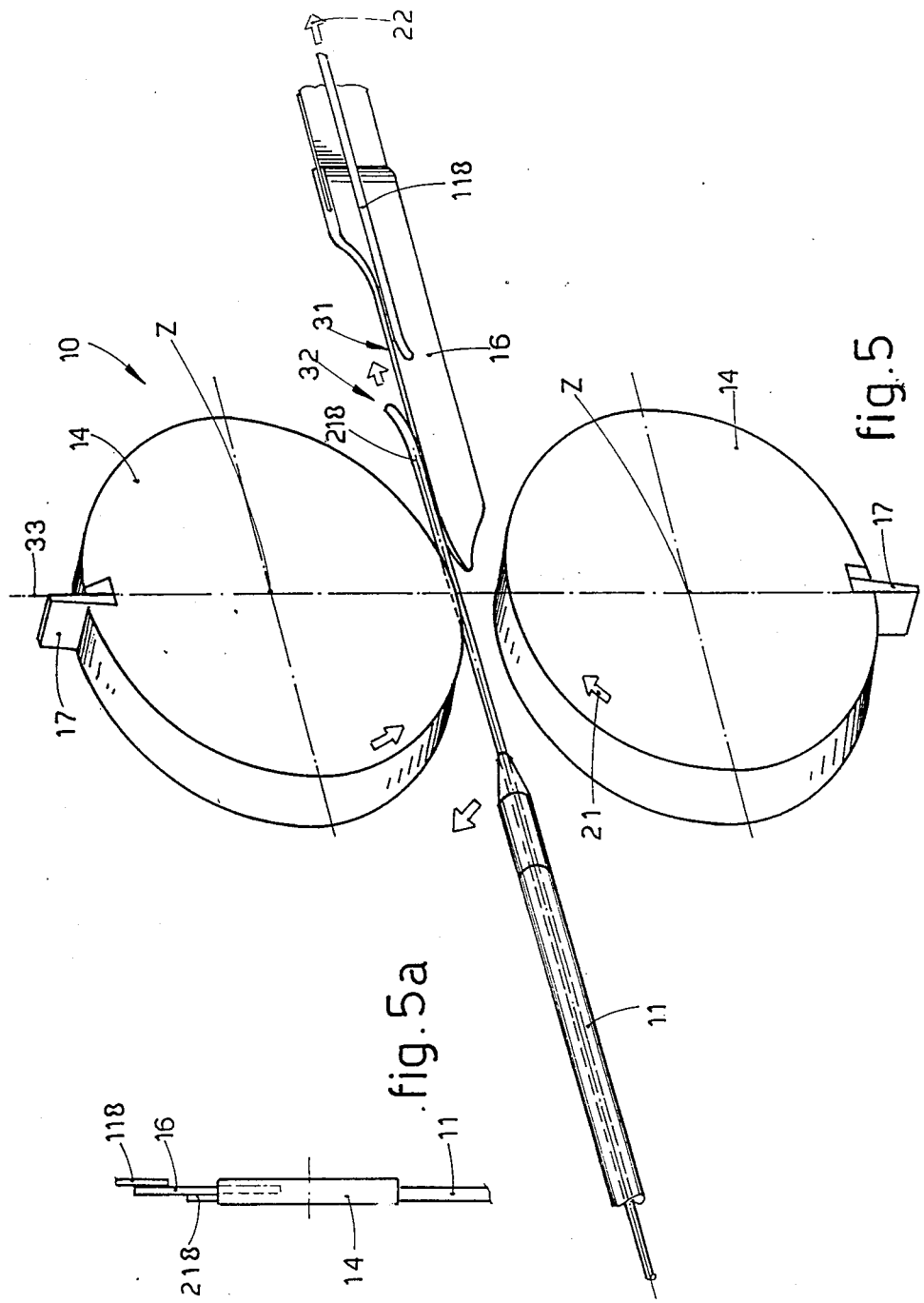

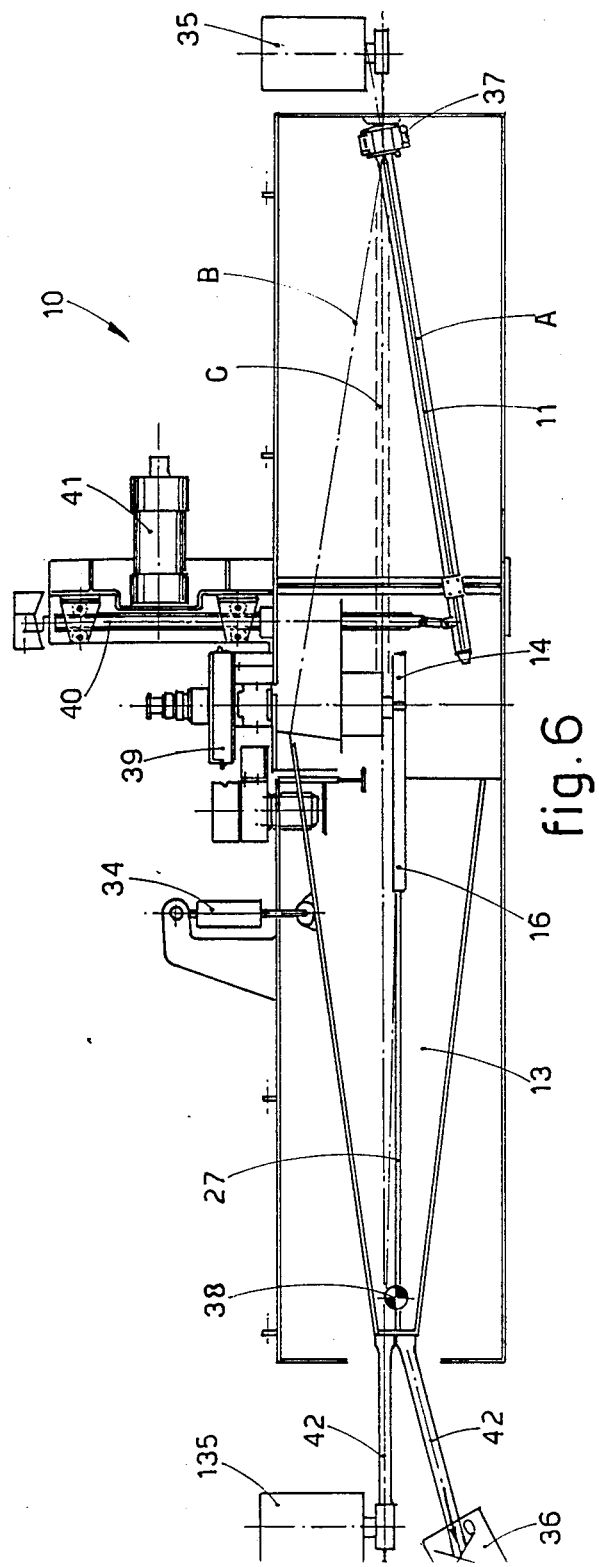

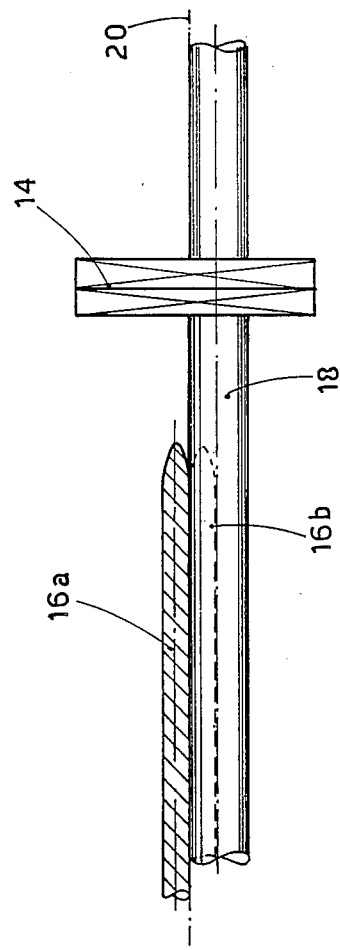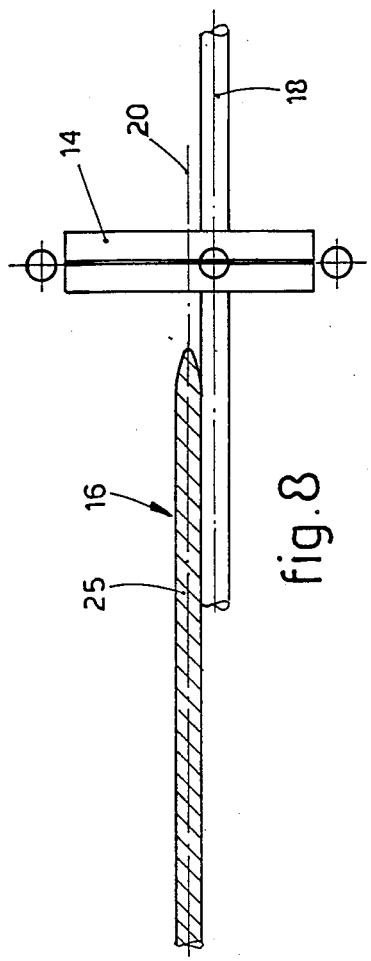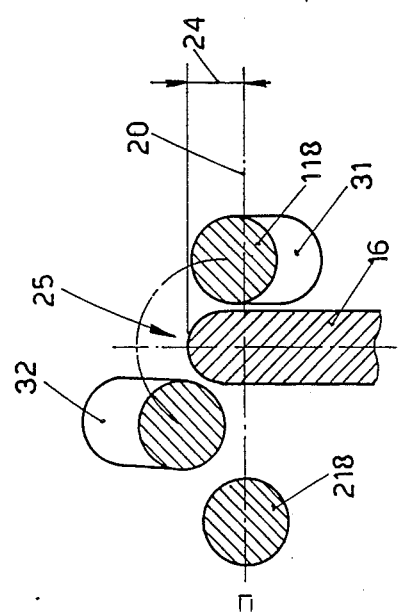
fig. 8
fig. 9
fig. 10

VERY HIGH SPEED FLYING SHEARS

This invention concerns a very high speed flying shears, that is to say, a shears able to shear to size in a required sequence the rolled stock travelling even at 100–120 meters per second.

High and very high speed flying shears normally comprise contrarotating blades of a start-stop type or of a continuously rotating type.

The invention can be applied to flying shears having continuously rotating blades or blades of a start-stop type.

The description hereinafter will deal only with the case of a flying shears having continuously rotating blades, but the invention covers also the case of flying shears having blades of a start-stop type.

Many trials have been conducted regarding flying shears and many patents have been filed which tend to enable rolled stock to be sheared when travelling at high speeds.

The present applicant too has designed, tested and embodied before now devices which can perform shearing at a high speed.

It has already been shown that, if shearing is to be carried out at a high speed, an exact coordination between the lateral position of the rolled stock and the circumferential position of the blades is needed.

FR 666.433 discloses a flying shears linked in a coordinated manner to a rolling assembly which shears the rolled stock to size with blades operated through a connecting rod.

To perform the shearing in this patent, the rolled stock is diverted momentarily along a loop. Even if the control and actuation system is updated, owing to the formation of this loop this invention can only process rolled stock travelling at up to medium speeds. In fact, the lateral separation of the two portions thus sheared becomes inaccurate as soon as the speed of lengthwise feed of the rolled stock is increased.

DE 804.056 and GB 2,075,899 disclose the shearing of the head and tail of the rolled stock by a flying shears cooperating with mechanical rotary means which traverse the rolled stock laterally as it passes. These embodiments are unacceptable for rolled stock being fed at high and very high speeds and also, more generally, in the case of any rolled product having programmed surface deformations such as round bars for building work, for instance.

Moreover, the lateral separation of the two portions thus sheared is not clean and the proposed system does not permit their accurate differentiation at high shearing speeds.

FR 1.578.587 discloses an updating of FR 666.433 with the provision of shearing of the head and tail. This is obtained with a mechanical displacement of the inlet and outlet channels. This embodiment involves useful suggestions but cannot be employed at high and very high speeds since coordination of the displacements and the control of the ends of the sheared portions are shown as being a simple mechanical link between the parts of which the mechanism consists.

This is unacceptable where the small lengths between such ends are displaced at high or very high speeds and have to be directed separately to differentiated lateral channels.

The problem to be overcome is therefore mainly connected to the proper lateral or vertical separation of the head portion from the main body of the rolled product, or else of the main body of the product from its tail portion, and also the despatch of such two sheared elements to different discharge channels.

It should be noted that in the case of slender rolled stock a speed of 120 meters per second corresponds to a speed of more than 430 kilometers per hour, and this means that minimum distances between the front element and the rear one are practically not noticed during the step of traditional mechanical deviation of the rolled stock.

It should be borne in mind that in the case of small sections of about 4–8 mm. the high and very high speeds are greater than 60–80 meters and normally reach 100 meters per second or more.

Even the larger sections with a correlative decrease in speed can be sheared, according to the present invention under examination, at speeds much higher than those which can be reached with known systems.

The present invention therefore tends to make possible a correct, accurate separation and a correct, differentiated delivery of the front element in relation to the rear element as sheared without leading to problems of contact or wrong delivery of the material or of abrasion of the rolled stock itself.

According to the invention a specific partition wall is arranged on the geometrically defined lengthwise axis of shearing.

This partition cooperates by means of its upper ridge with the head of the successive element in conveying such successive element into a channel different from the channel of the passage of the preceding element.

We mention here in a generic manner a preceding element and a successive element; the preceding element may be the head portion or the central body, while the successive element may be the central body or the tail portion, or may be possible sheared segments where continuous shearing to size is being carried out.

According to the invention the rolled stock is positioned, at the moment of shearing, in a position which coincides substantially with the lengthwise shearing axis.

According to the invention there is a rigid link, at least during the transient period before the shearing moment, between the lateral position of the rolled stock, to which a lateral movement is also momentarily imparted, and the circumferential position of the knives, which also are in continuous movement during such transient period.

The outcome is that an instant before the shearing the rolled stock is situated, on the horizontal plane containing the shearing axis, at an angle, even though very slightly, to the shearing axis, and that an instant after the shearing the successive element is also situated at an angle to the shearing axis but at an angle with another sign than the previous angle.

Moreover, when the rolled stock on arrival lies substantially on the shearing axis, the knives lie substantially on the vertical plane containing their axes of rotation; the rolled stock is sheared and the front element runs substantially along the specific partition but parallel to the shearing axis.

According to the invention a slight contact between the knives enhances this situation by causing a slight upward bending of the arriving rolled stock and by thus assisting a transverse surmounting of the partition owing to the lateral and lengthwise movement of the rolled stock itself.

This surmounting enables the front and rear sheared elements to be correctly delivered into their specific, separate discharge channels.

According to a variant the guide is provided with vertical adjustment correlated, even only in steps, with the diameter of the rolled stock to be sheared.

The invention therefore concerns a very high speed flying shears according to the features of claim 1, the dependent claims disclosing some variants.

The attached figures, which are given as a non-restrictive example of the embodiment of the invention, show an embodiment of the invention.

FIGS. 1 to 5 give three-dimensional views of various reciprocal positions of the knives and of the laterally movable guide in which the rolled stock runs;

FIGS. 1a to 5a show from above the same positions as those shown in three dimensions in FIGS. 1 to 5;

FIG. 6 shows from above a high speed shears;

Figure 7:
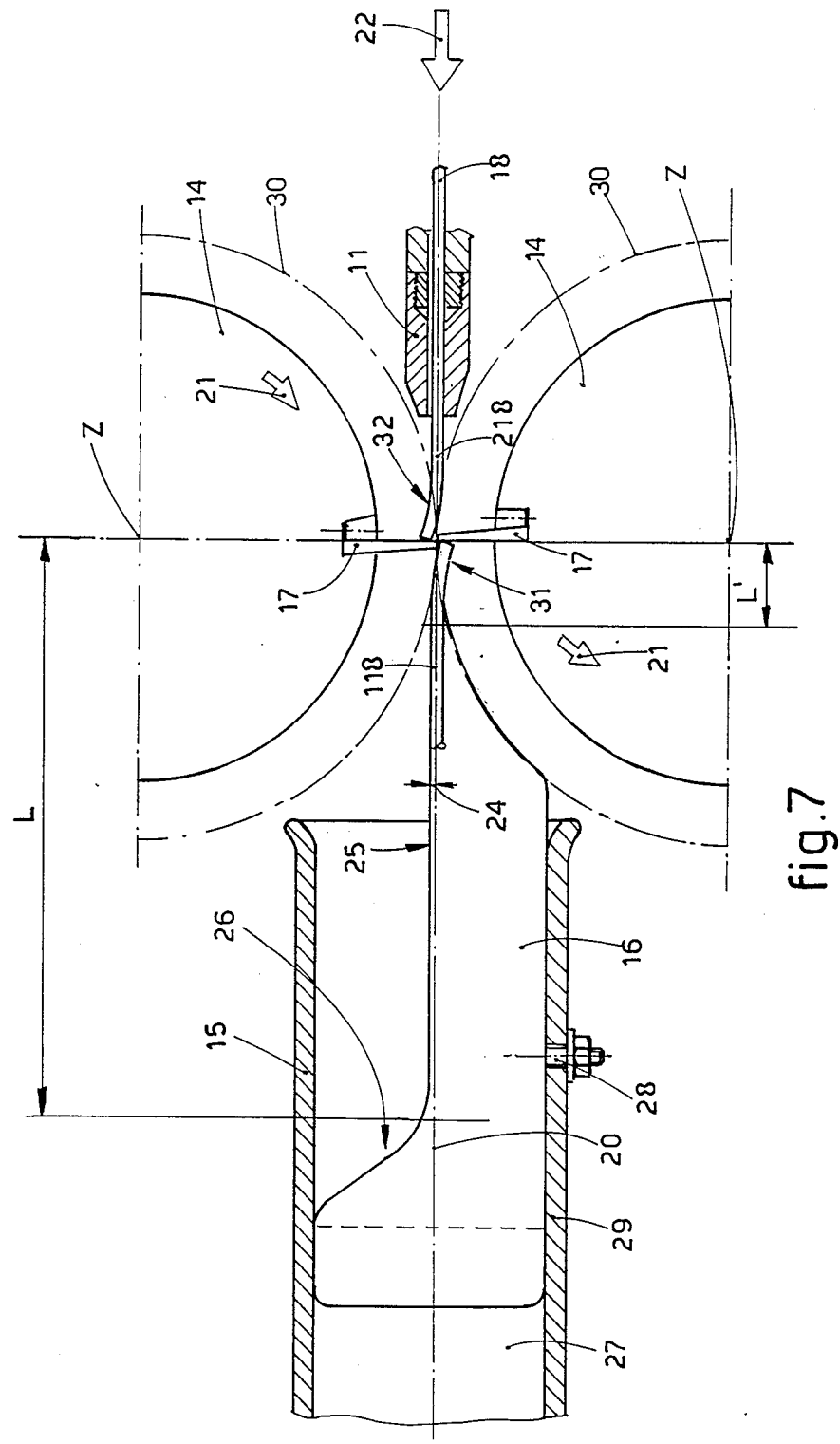

FIG. 7 gives a side view of the shearing moment;

FIGS. 8 and 9 give two preferred views of the phenomenon employed by the invention;

FIG. 10 gives a possible embodiment of a variant where the shears is used for large sections;

FIGS. 11 and 12 show in Cartesian coordinates the relationship of the lateral displacement speed to the position of the guide.

A flying shears 10 comprises two knives 14 able to contrarotate in relation to each other and kinematically connected together, so that the peripheral speed of one knife coincides exactly with the peripheral speed of the other.

Each knife 14 bears its respective blade 17 and their direction of rotation 21 coincides with the direction of feed 22 of rolled stock 18.

The blades 17 (see FIG. 7) comprise advantageously a slight overlapping segment at their point of cross-over coinciding with a plane 33 that contains the axes "Z" of rotation of the knives 14.

The rolled stock 18 is guided in a guide 11 able to move sideways in a required manner substantially in a horizontal plane (that is, parallel and intermediate to the planes containing the axes "Z") containing a shearing axis 20.

The guide 11 can move with a direction of movement 19 or 119, depending on the type of shearing taking place, which in this example is shearing of the head or tail respectively.

Lateral displacement of the guide 11 is governed in our example by a gear wheel and threaded shaft 40, or another known system, actuated and controlled by a deviation motor 41, the guide 11 being pivotable about a centre of rotation 37.

The starting position of the guide 11, if the head of the rolled stock is to be sheared, as in FIG. 6, is position A; the position of arrival after the cycle of shearing the head is position B, whereas the coiling position is position C. Positions B and C may coincide.

The cycle to shear the tail of the rolled stock arranges that the guide 11 starts from position C, goes to position B and then moves from position B to position A after the shearing of the tail in a position coinciding with the shearing axis 20.

The shearing axis 20 connects substantially an intake entraining means 35, the knives 14 and an offtake entraining means 135.

The knives 14 are set and kept in rotation by a drive chain driven by a motor 39 of the knives.

A conveyor channel 13 is included downstream of the knives 14 and may be immovable or able to oscillate by a very small angle with its centre of rotation at 38, being moved by a jack 34.

The conveyor channel 13 comprises an internal dividing wall 27, which extends frontally towards the knives 14 by means of a specific partition 16, which approaches as closely as possible the plane 33 containing the axes of rotation "Z" of the knives 14.

Thus, the guide 11 starts from position A, reaches a speed coordinated with the peripheral speed of the blades 17 of the knives 14, performs the shearing operation, slows down until it reaches position B and then positions itself at C for the coiling step.

The speed of lateral traversing 19 or 119 of the guide 11 before the shearing operation is such that the lateral position of the guide 11 is strictly correlated with the angular position of the blades 17 of the knives 14.

The reason for this is that, at least at about the shearing moment, the guide 11 moves at each revolution of the blades 17 by a determined step and, when the axis of the guide 11 is located on the shearing axis 20, the blades 17 of the knives 14 lie on the plane 33 containing the axes of rotation "Z" of the knives 14 themselves.

Conveyors 42 are positioned downstream of the conveyor channel 13 and cooperate specifically with the offtake entraining means 135 or with a scrap shears 36.

The offtake entraining means 135 in turn cooperates with a coiling plant or another plant suitable for the purpose.

According to the invention the guide 11, as shown in FIG. 7, passes in its sideways displacement in the immediate neighborhood of contact rollers 30 which enclose the end position of the blades 17 when rotating.

The partition 16 too approaches as near as possible to the plane 33 containing the axes of rotation "Z" of the knives 14, as is shown in FIG. 7, but does so without touching the contact rollers 30.

The distance L' of the frontal point of the partition 16 from the plane 33 can be correlated with the diameter of the rolled stock 18, so that the more that diameter increases, the more the value of L' becomes.

The partition 16 cooperates with a bottom 29 of the conveyor channel 13, which in this example is enclosed at its top by a cover 15 rotatable on hinges 23.

By lifting the cover it is therefore possible to have access to the inside of the conveyor channel 13.

The initial segment of the partition 16 does not reach the overall height of the conveyor channel 13.

The partition 16 is secured advantageously to the bottom 29 of the conveyor channel 13 by an anchorage pin 28 and by a forked portion, which engages the internal dividing wall 27 and keeps the partition 16 in position.

This solution, which may also be embodied with another suitable solution, is such as to enable the partition 16 to be readily replaced so that it can be adapted to the requirements of the various ranges of dimensions of the rolled stock 18.

The partition 16, as shown in FIG. 7, comprises an upper ridge 25 substantially parallel to the shearing axis 20 and vertically distant from the shearing axis 20 by a determined value 24.

This value 24 is determined according to the diameter of the rolled stock 18 and the type of transverse radiusing forming the ridge 25 itself.

The length L of the upper ridge 25 is determined as a function of the speed of lengthwise feed 22 of the rolled stock 18.

The speed of lengthwise feed 22 of the rolled stock 18 conditions the speed of lateral displacement 19-119 of the guide 11 at least at about the transient period of shearing.

The partition 16 is adapted to the inner height of the conveyor channel 13 by a rounded spine 26, which connects the ridge 25 to the upper part of the partition 10 cooperating substantially with the cover 15.

As we said earlier, the knives 14 rotate continuously at least during the shearing cycle while the guide 15 moves from position A to position C and viceversa, depending on the type of shearing being carried out.

FIGS. 11 and 12 respectively show the cycle of shearing the head (FIG. 11) and the cycle of shearing the tail (FIG. 12). The lateral position of the axis of the guide 11 is shown in abscissae, whereas the speed "V" of displacement of the guide 11 is shown in ordinates.

As can be seen in FIG. 11, the guide 11 leaving position A accelerates progressively until it reaches the standard speed "VR", which it maintains for a tract "LR" until the shearing has been performed; it then slows down progressively until position B and then reaches position C, where it halts finally. As we said earlier, positions B and C may also coincide.

Instead, in FIG. 12 the guide 11 starts from position C, accelerates progressively until it reaches the standard speed "VR", maintains that speed only along the tract "LR" to perform shearing on the axis 20 and then slows down progressively until it halts at position A.

During the tract "LR", where the guide 11 travels at the standard speed "VR", the lateral position of the guide 11 is strictly correlated with the circumferential position of the blades 17. The result of this is that, when the axis of the guide 11 lies substantially coaxially with the shearing axis 20, the blades 17 of the knives 14 lie substantially on the vertical plane 33 containing the axes of rotation "Z" of the knives 14 themselves.

The shearing cycle and the method on which the invention is based are shown in FIGS. 1 to 5.

Figure 1:
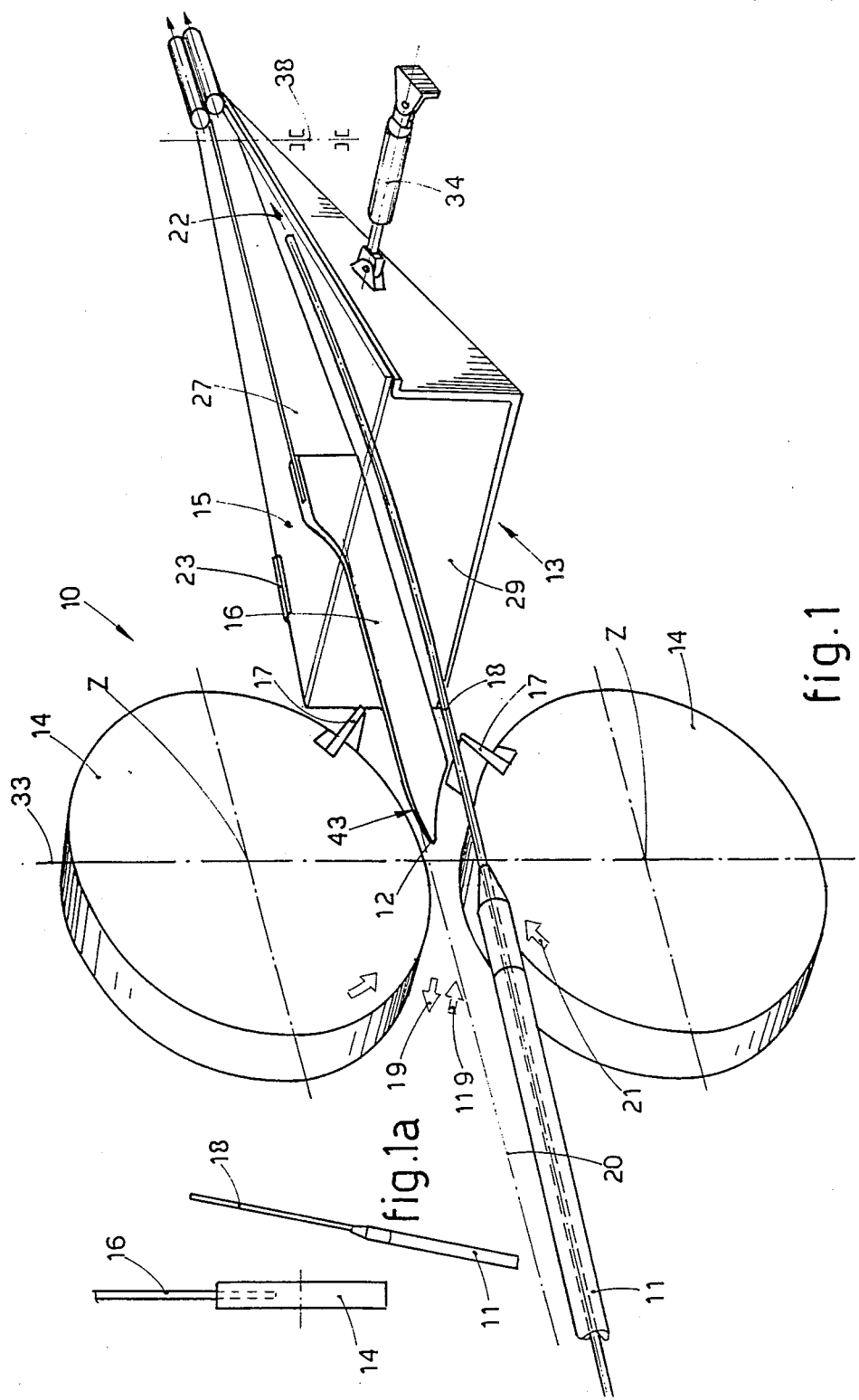

FIG. 1 shows the guide 11 with the rolled stock 18 just emerging, the lateral position of the guide 11 being correlated with the circumferential position of the blades 17.

Figure 2:
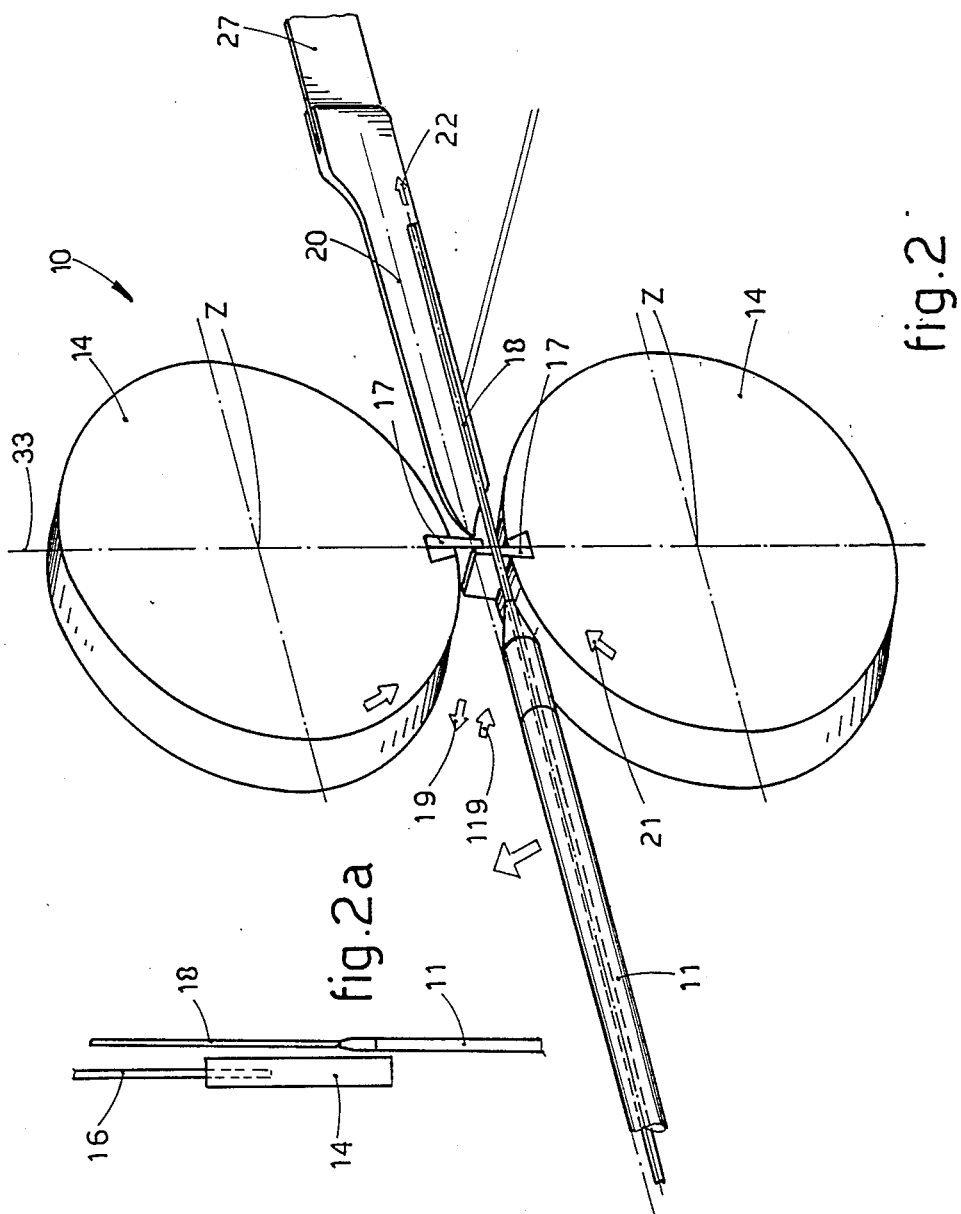

In FIG. 2 the guide 11 has by now reached a lateral position very near the blades 17 while continuing its lateral displacement according to the arrow 19. As can be seen, the blades 17 of the knives 14 in the position of FIG. 2 lie in a shearing position, while the rolled stock 18 passes lengthwise according to the arrow 22 outside the knives 14.

Figures 3, 3A:
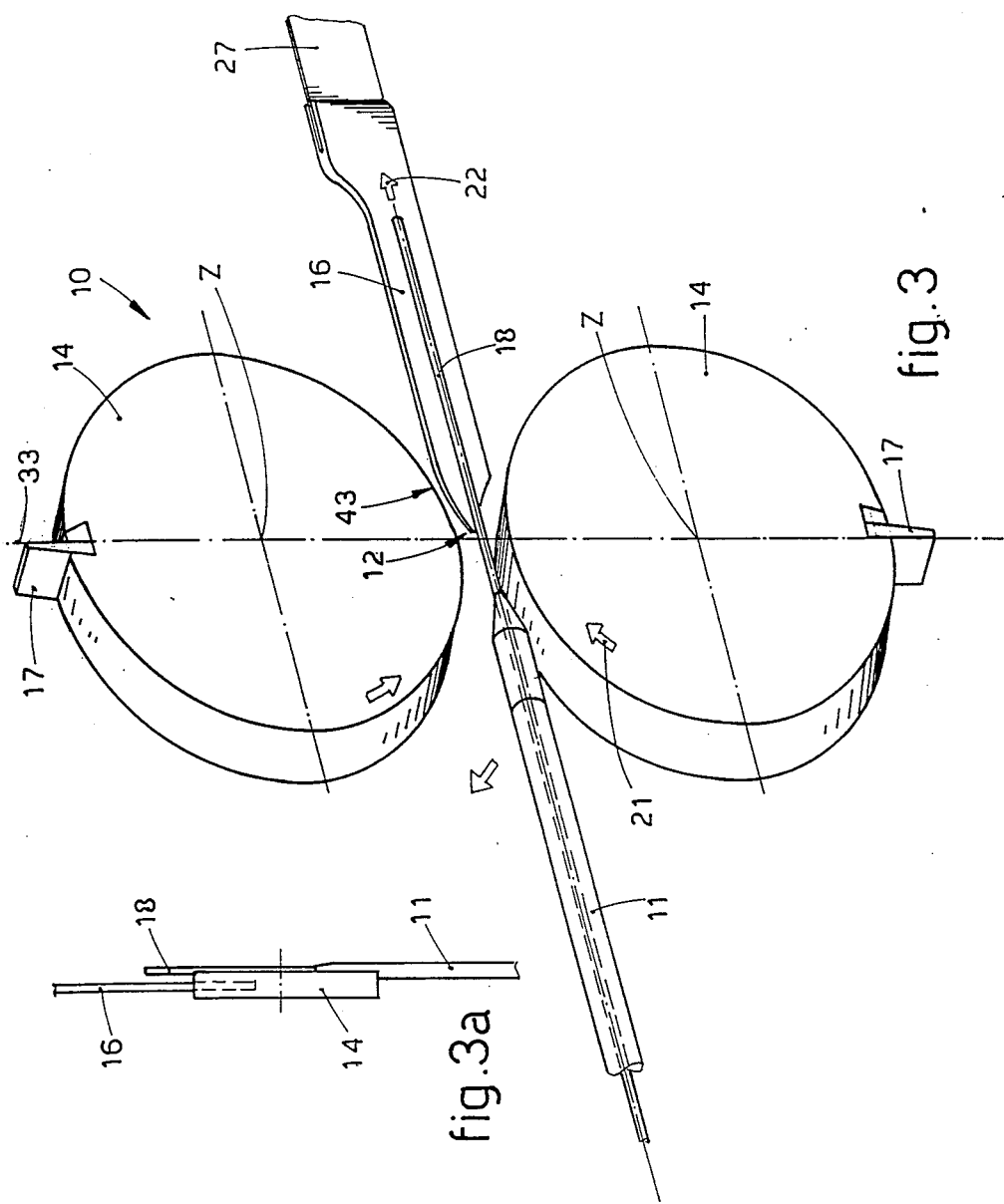

In FIG. 3 the rolled stock 18 has by now entered the zone of contact with the knives 14 while it continues its lateral travel according to the arrow 19 and its lengthwise travel according to the arrow 22. In the position of FIG. 3, which coincides with that of FIG. 8, the rolled stock runs very near the partition 16 but still does not touch it substantially.

FIG. 4, which coincides substantially with FIG. 7, shows the situation at the end of shearing; here the axis of the guide 11 coincides substantially with the shearing axis 20. In this situation the rolled stock 18 has been sheared into the portions 118 and 218, while the blades 17 of the knives 14 lie substantially on the plane 33 containing the axes of rotation "Z" of the knives 14 themselves. As can be seen, the knives 14 have their blades 17 coupled together and have just completed the shearing.

In the situation of FIG. 4 the front portion 118 of the rolled stock 18 is supported laterally by the partition 16 and continues its travel according to the arrow 22, while the knives 14 with their blades 17 determine the formation of a downwardly curved rear end 31 of the front portion 118.

The rear portion 218 lies substantially on the shearing axis 20 and, once again owing to the momentary reciprocal positions of the blades 17 of the knives 14, comprises an upwardly curved front end 32.

Whereas the front portion 118 slides on the side wall of the partition 16 and moves no longer laterally but only lengthwise according to its direction of feed 22, the rear portion 218 continues its sideways displacement according to the arrow 19 owing to its own inertia and also owing to the action of the guide 11.

The presence of the upwardly curved front end 32 and the action of lateral thrust enable the rolled stock 18, being fed as shown in FIG. 9, to pass over (FIGS. 9 and 5) the upper ridge 25 of the partition 16 and thus to make use also of its own lengthwise resilience. This enables the rear portion 218 to pass laterally over the partition 16 and to position itself with ease on the other side of the internal dividing wall 27 while continuing its lateral 16 and lengthwise 22 travel.

This action of passing over the partition is further assisted by the frontal conformation of the partition 16, which comprises at its front end a rounded tongue 43, which brings the upper ridge 25 downwards and makes it cooperate at least with the lengthwise shearing axis 20.

This rounded tongue 43 brings advantageously the forward point 12 of the partition 16 below the lengthwise shearing axis 20 so as to assist the surmounting action of the curved front end 32 and the momentary resilient bending action of the rolled stock 18.

Thus, the cooperation between the reciprocal positions of the blades 17, the momentary position of the guide 11 and the geometric conformation of the partition 16 make possible the transverse surmounting of the partition 16 by the rear portion 218 in its travel, thus enabling a clean and definite separation to be obtained between the front portion 118 and rear portion 218 sheared by the shears 10.

When processing large sections, it may be found advantageous (FIGS. 6 and 10) to displace laterally by means of a jack 34 the conveyor channel 13, which in this case will rotate on the pivot 38. This lateral displacement causes the partition 16 to assume either position 16a or 16b, as seen in FIG. 10. Such displacement is very small (FIG. 10) and serves only to position the partition 16 better in relation to the lengthwise shearing axis 20, so that the rolled stock 18 during the shearing step will be positioned correctly.

Such displacement will be to the right or to the left of the shearing axis, depending on the specific shearing action to be performed.

According to a variant the partition 16 or the upper ridge of the partition 16 may be adjusted in height so as to be positioned in the best possible position in relation to the diameter of the rolled stock 18.

I claim:

1. Very high speed flying shears suitable for shearing rolling stock travelling even at a speed of more than one hundred meters per second, comprising:

two knives which counter-rotate relative to each other at a first predetermined speed at least during a shearing period and which define a shearing axis, each of said knives having a blade located at a circumferential position, each said blade extending substantially across the entire width of said knife;

a guide adapted to move essentially horizontally at a second predetermined speed to position the rolled stock at a desired lateral position relative to the shearing axis; and a conveyor channel located downstream of the knives and having an inner dividing wall;

means for moving the guide essentially horizontally during the shearing period with the second predetermined speed being correlated with the first predetermined speed, and the lateral position being correlated to the circumferential position of the blades so that the guide is substantially parallel to the shearing axis while the guide moves at said second predetermined speed and the blades cut the rolled stock;

said inner dividing wall comprising a partition, said partition having an end portion which has a transversely rounded upper surface, said upper surface being located a predetermined distanced above said shearing axis, said predetermined distance being related to the diameter of the rolled stock;

said rounded upper surface extending essentially parallel to said shearing axis, and said end portion further comprising a frontal rounded tongue which extends at an angle down from said rounded upper surface and which defines a frontal point.

2. The flying shears as claimed in claim 1, wherein said end portion has a length which is related to the axial speed of the rolled stock.

3. The flying shears as claimed in claim 1, wherein the axes of rotation of said knives define a vertical plane perpendicular to said shearing axis, and wherein the distance between the partition and the vertical plane is related to the diameter of the rolled stock.

4. The flying shears as claimed in claim 1, wherein the vertical position of said rounded upper surface can be varied according to the thickness of the rolled stock.

5. The flying shears as claimed in claim 1, wherein said frontal point is located in a horizontal plane which is near the shearing axis.

6. The flying shears as claimed in claim 5, wherein said horizontal plane is below the shearing axis.

7. The flying shears as claimed in claim 1, wherein, said partition defines a median vertical plane which substantially contains the shearing axis.

8. The flying shears as claimed in claim 1, wherein said partition defines a median vertical plane, said partition being movable so as to vary an angle between said median vertical plane and said shearing axis.

9. The flying shears as claimed in claim 1, wherein the axes of rotation of said knives define a vertical plane perpendicular to said shearing axis, and wherein the blades of said knives overlap each other when the blades are contained in said vertical plane.

10. The flying shears as claimed in claim 1, wherein the blades of said knives are shaped so as to create an upwardly curved front end in a rear sheared portion of the rolled stock.

11. The flying shears as claimed in claim 10, wherein said upwardly curved front end cooperates with the frontal rounded tongue and the rounded upper surface so as to pass laterally over the partition.

12. The flying shears as claimed in claim 1, wherein the blades of said knives are shaped so as to create a downwardly curved rear end in a front sheared portion of the rolled stock.

13. The flying shears as claimed in claim 12, wherein said partition defines a vertical flank portion, and wherein said downwardly curved rear end cooperates with said flank portion.

14. Very high speed flying shears suitable for shearing rolling stock travelling even at a speed of more than one hundred meters per second, comprising:

two knives which counter-rotate relative to each other at a first predetermined speed at least during a shearing period and which define a shearing axis, each of said knives having a blade located at a circumferential position, each said blade extending substantially across the entire width of said knife;

a guide moving means for moving a guide essentially horizontally at a second predetermined speed and positioning the rolled stock at a desired lateral position relative to the shearing axis; and a conveyor channel located downstream of the knives and having an inner dividing wall, said inner dividing wall comprising a partition which divides the conveyor channel into two compartments, said partition having an end portion which has two opposing side surfaces and a transversely rounded upper surface, said upper surface extending essentially parallel to said shearing axis, wherein during the shearing period, said knives cut the rolled stock into a front sheared portion and a rear sheared portion, and wherein the guide moves horizontally so as to cause said rear sheared portion to pass over said rounded upper surface from one of said compartments into the other of said compartments;

said end portion further comprising a frontal rounded tongue which extends at an angle down from said rounded upper surface and which defines a frontal point.

15. The flying shears as claimed in claim 14, wherein during the shearing period, the second predetermined speed is correlated with the first predetermined speed, and the lateral position is correlated to the circumferential position of the blades so that the guide is substantially parallel to the shearing axis while the guide moves at said second predetermined speed and the blades cut the rolled stock.

16. The flying shears as claimed in claim 14, wherein said rounded upper surface is located a predetermined distanced above said shearing axis, said predetermined distance being related to the diameter of the rolled stock.

17. The flying shears as claimed in claim 14, wherein said end portion has a length which is related to the axial speed of the rolled stock.

18. The flying shears as claimed in claim 14, wherein the axes of rotation of said knives define a vertical plane perpendicular to said shearing axis, and wherein the distance between the partition and the vertical plane is related to the diameter of the rolled stock.

19. The flying shears as claimed in claim 14, wherein the vertical position of said rounded upper surface can be varied according to the thickness of the rolled stock.

20. The flying shears as claimed in claim 14, wherein said frontal point is located in a horizontal plane which is near the shearing axis.

21. The flying shears as claimed in claim 20, wherein said horizontal plane is below the shearing axis.

22. The flying shears as claimed in claim 14, wherein said partition defines a median vertical plane which substantially contains the shearing axis.

23. The flying shears as claimed in claim 14, wherein said partition defines a median vertical plane, and wherein said partition is movable so as to vary an angle between said median vertical plane and said shearing axis.

24. The flying shears as claimed in claim 14, wherein the axes of rotation of said knives define a vertical plane perpendicular to said shearing axis, and wherein the blades of said knives overlap each other when the blades are contained in said vertical plane.

25. The flying shears as claimed in claim 14, wherein the blades of said knives are shaped so as to create an upwardly curved front end in said rear sheared portion of the rolled stock, and wherein said upwardly curved front end cooperates with the frontal rounded tongue and the rounded upper surface so as to pass laterally over the partition.

26. The flying shears as claimed in claim 14, wherein the blades of said knives are shaped so as to create a downwardly curved rear end in said front sheared portion of the rolled stock, and wherein said downwardly curved rear end cooperates with one of said opposing side surfaces.

27. Very high speed flying shears suitable for shearing rolling stock travelling even at a speed of more than one hundred meters per second, comprising:
two knives which counter-rotate relative to each other at a first predetermined speed at least during a shearing period and which define a shearing axis, each of said knives having a blade located at a circumferential position, each said blade extending substantially across the entire width of said knife;
a guide, upstream of said two knives, adapted to move essentially horizontally at a second predetermined speed to position the rolled stock at a desired lateral position relative to the shearing axis; and
a conveyor channel located downstream of the knives and having an inner dividing wall;
means for moving the guide essentially horizontally during the shearing period with the second predetermined speed being correlated with the first predetermined speed, and the lateral position being correlated to the circumferential position of the blades so that the guide is substantially parallel to the shearing axis while the guide moves at said second predetermined speed and the blades cut the rolled stock;
wherein said inner dividing wall comprises a partition, said partition having an end portion which has a transversely rounded upper surface, said upper surface being located a predetermined distance above said shearing axis, said predetermined distance being related to the diameter of the rolled stock;
axes of rotation of said knives define a vertical plane perpendicular to said shearing axis;
the distance between the partition and vertical plane is related to the diameter of the rolled stock
said partition defining a median vertical plane which substantially contains the shearing axis;
said rounded upper surface extends essentially parallel to said shearing axis, and said end portion further comprises a frontal rounded tongue which extends at an angle down from said rounded upper surface and which defines a frontal point;
the blades of said knives are shaped so as to create an upwardly curved front end in a rear sheared portion of the rolled stock;
said upwardly curved front end cooperates with the frontal rounded tongue and the rounded upper surface so as to pass laterally over the partition.

* * * * *